United States Patent Office 3,718,732
Patented Feb. 27, 1973

3,718,732
METHOD OF RECOVERING CHEMICAL VALUES FROM A FORMATE-SODIUM HYDROSULFITE REACTION MIXTURE
Charles E. Winslow, Jr., Norfolk, Jack Plentovich, Nansemond County, and Mearl A. Kise, Portsmouth, Va., assignors to Virginia Chemicals Inc., Portsmouth, Va.
Filed Jan. 13, 1971, Ser. No. 106,179
Int. Cl. C01d 5/02
U.S. Cl. 423—199                         14 Claims

ABSTRACT OF THE DISCLOSURE

Method of recovering chemical values from a waste effluent such as a formate-sodium hydrosulfite reaction medium after removal of the sodium hydrosulfite. The method eliminates from the reaction medium residue those reducing agents which create a chemical oxygen demand in any body of water into which they might be discharged. The method includes: introducing sulfuric acid into the reaction medium; boiling to expel sulfur dioxide, continuing boiling and distilling with reflux of methyl alcohol and methyl formate; filtering the reaction medium residue to remove sulfur; and separating the residue salt from water after removing of sulfur.

CROSS-REFERENCES TO RELATED APPLICATIONS

The present invention is directed to the recovery of chemical values from a process waste effluent, such as that described in applicants' earlier filed application entitled Method of Producing Sodium Hydrosulfite (Ser. No. 9,078), filed Feb. 5, 1970 and issued as Pat. No. 3,576,598 on Apr. 27, 1971.

BACKGROUND OF THE INVENTION

In the process for manufacturing sodium hydrosulfite via the sodium formate process, sulfur dioxide and sodium hydroxide are used as raw materials in addition to sodium formate. The reaction is effected in a medium consisting predominantly of methyl alcohol but containing substantial quantities of water. As a result of intermediate reactions, side reactions, and the incomplete utilization of raw materials, the reaction medium at the completion of the synthesis contains, in addition to methyl alcohol and water, substantial quantities of dissolved sodium formate, methyl formate, sodium bisulfite, sodium sulfite, sodium thiosulfate and possibly some other salts. The product, sodium hydrosulfite, is completely insoluble in this medium and thus forms a slurry with it. The separation of the two, the sodium hydrosulfite and the reaction medium is accomplished by filtration.

Economic considerations dictate that the filtrate resulting from this separation be subjected to a distillation process for the recovery of the very substantial amount of methyl alcohol which it contains. In this distillation, the methyl formate is recovered along with the methyl alcohol since the methyl formate is equally as volatile as the methyl alcohol.

The bottoms, or residue, remaining when the distillation is completed consists of the water originally contained in the reaction medium plus the previously mentioned soluble salts, sodium formate, sodium bisulfite, sodium sulfite and sodium thiosulfate.

Disposal of this residue presents a very serious pollution problem in that all of the dissolved substances are reducing agents and would thus create a chemical oxygen demand in any body of water into which they might be discharged. Chemical oxidation prior to disposal is difficult and extremely expensive. More attractive is an economical method of recovery of the chemical values in this residue, and subsequently reusing or selling the valuable compounds thus recovered.

SUMMARY OF THE INVENTION

According to the present invention chemical values from a formate-sodium hydrosulfite reaction medium may be recovered after filtering and removal of the sodium hydrosulfite by introducing sulfuric acid into the reaction medium, boiling gently so as to expel sulfur dioxide, continuing boiling and distilling, with reflux, methyl alcohol and methyl formate, filtering the reaction medium residue and thereby removing sulfur. The reaction medium residue may then be evporated, so as to separate sodium sulfate from water. The recovered chemical values may then be re-cycled or sold on the open market.

DESCRIPTION OF THE PREFERRED EMBODIMENTS

Figure 1:
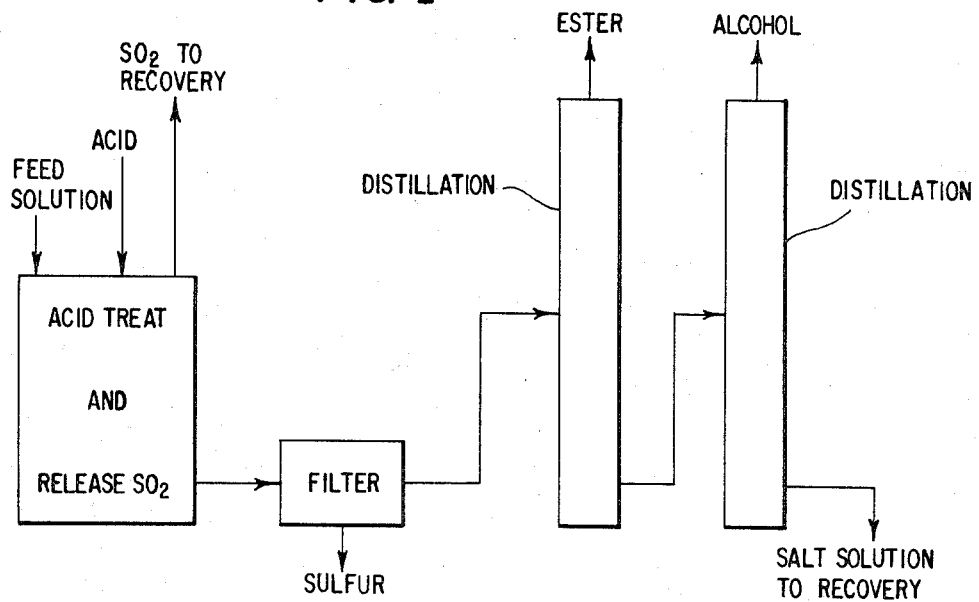
FIG. 1 is a flow sheet depicting recovering of chemical values from a waste solution, according to the present method.
Figure 2:
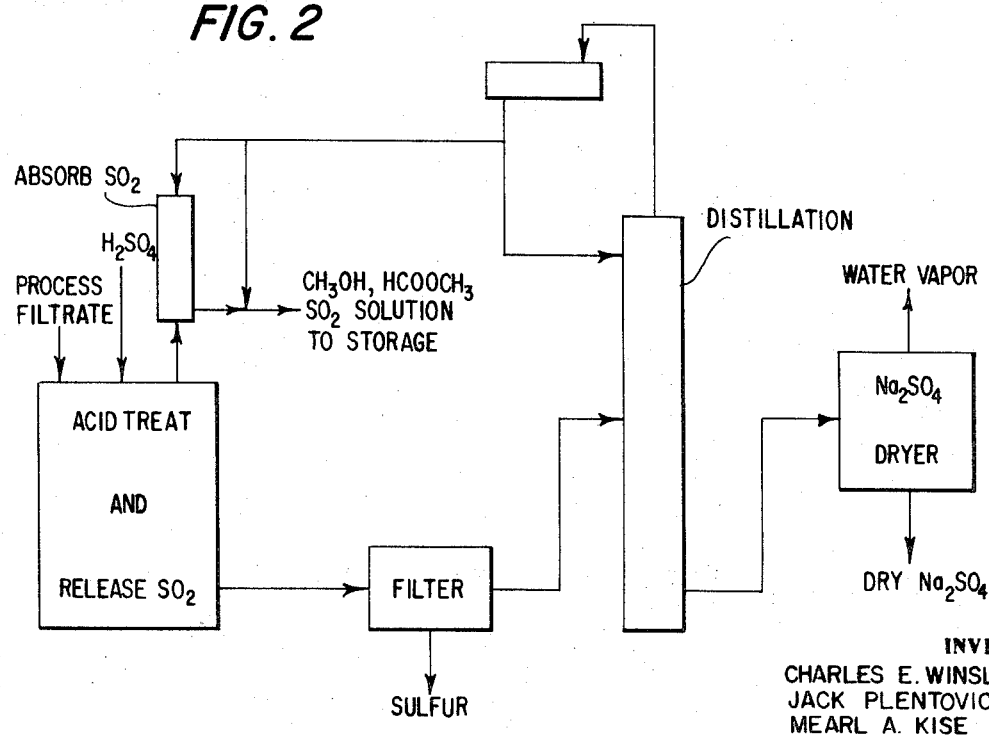
FIG. 2 is another flow sheet depicting recovery of chemical values from a formate-sodium hydrosulfite reaction medium after filtering and removal of the sodium hydrosulfite.

In the production of hydrosulfites using formates, it has been found that a substantial portion of the chemical values can be recovered by treating the filtrate prior to distillation with a strong acid such as sulfuric acid. The following reactions are believed to take place:

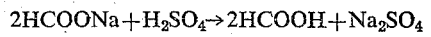
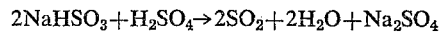
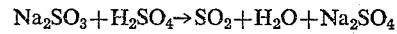
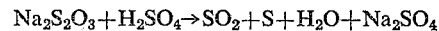
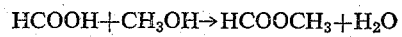

$2HCOONa + H_2SO_4 \rightarrow 2HCOOH + Na_2SO_4$ $2NaHSO_3 + H_2SO_4 \rightarrow 2SO_2 + 2H_2O + Na_2SO_4$ $Na_2SO_3 + H_2SO_4 \rightarrow SO_2 + H_2O + Na_2SO_4$ $Na_2S_2O_3 + H_2SO_4 \rightarrow SO_2 + S + H_2O + Na_2SO_4$ $HCOOH + CH_3OH \rightarrow HCOOCH_3 + H_2O$ According to these reaction equations, four substances of value are produced: sulfur, which may be recovered by filtration; methyl formate and sulfur dioxide, both of which may be recovered by distillation; and sodium sulfate, which may be recovered by evaporation of the bottoms remaining after the distillation.

The recovery may be accomplished in a practical industrial manner via either a continuous or a batch process. Sulfuric acid is added to and mixed with the filtrate in an amount very slightly in excess of stoichiometric based on the total sodium content of the filtrate. This is best accomplished in a glass-lined or otherwise corrosion-resistant vessel. Gently boiling the mixture will evolve the sulfur dioxide released in the reaction. Essentially complete removal of the sulfur dioxide is necessary in order that reaction of the sodium thiosulfate with the sulfuric acid be complete. Recovery of the evaporated sulfur dioxide may be accomplished by absorption in water or methyl alcohol or any other convenient method.

Filtration of the treated mixture will remove the precipitated sulfur. The mixture, now stripped of sulfur dioxide and sulfur, may be fed to a distillation unit for recovery of the methyl formate and methyl alcohol. The distillation may be conducted in such a manner as to yield these two materials as separate and distinct products, or it may be conducted so as to yield the two materials as a single mixed product. In either case the bottoms, or residue, remaining on completion of the distillation contains only water and sodium sulfate. Evaporation, flash drying, or spray drying of this solution will yield solid sodium sulfate and leave no residue for disposal.

Example I

The following is an actual example of use of this recovery process:

The filtrate resulting from the separation of the sodium hydrosulfite from a reaction slurry had a weight of 6260 parts. It consisted of 4696 parts methyl alcohol, 840 parts water, 231 parts methyl formate, 163 parts sodium formate, 222 parts sodium bisulfite, 45 parts sodium sulfite, and 63 parts sodium thiosulfate. Sulfuric acid (50%) to the extent of 600 parts was added to the filtrate and mixed thoroughly. The mixture was boiled gently at approximately 74° C. for 30 minutes expelling 185 parts of sulfur dioxide which was recovered by absorption in 700 parts of cold methyl alcohol. The rate of boiling was then increased to that needed for distillation with reflux, and over a 90 minute period a single distillation product was obtained consisting of 4620 parts of methyl alcohol and 375 parts of methyl formate. The residue from the distillation, 1678 parts, was then filtered to recover 13 parts of sulfur. The filtrate consisted of 430 parts sodium sulfate and 1235 parts water.

The foregoing example is specific for the recovery of chemical values for reuse in the sodium formate process for the manufacture of sodium hydrosulfite. Sulfur dioxide absorbed in methyl alcohol is a feed solution for this process, as is methyl formate dissolved in methyl alcohol. The sulfur dioxide evolved could just as well be absorbed in water or compressed and liquified for other use or sale. Also, the methyl formate could be recovered as a pure distillation product for use or sale.

The present recovery process is not solely limited in use to the sodium formate process for producing sodium hydrosulfite. It is generally applicable to the recovery of any chemical values which may be converted to volatile materials by acidification. The acid used is not limited to sulfuric alone but may be hydrochloric, nitric, phosphoric, or the like resulting respectively in the production of chloride, nitrates and phosphates, in the bottom solution remaining after filtration.

We claim:

1. Method of recovering chemical values from a formate-sodium hydrosulfite reaction medium containing methyl formate, sodium sulfite, sodium bisulfite and sodium thiosulfate after filtering and removing the sodium hydrosulfite, comprising:
    (A) introducing sulfuric acid into said reaction medium and mixing;
    (B) boiling gently said reaction medium so as to expel sulfur dioxide;
    (C) continuing boiling said reaction medium and distilling with reflux of methyl formate; and
    (D) filtering the reaction medium residue and removing sulfur.

2. Method of recovering chemical values from a formate-sodium hydrosulfite reaction medium containing methyl alcohol, methyl formate, sodium sulfite, sodium bisulfite and sodium thiosulfate after filtering and removing of the sodium hydrosulfite, comprising:
    (A) introducing sulfuric acid into said reaction medium and mixing so as to obtain sulfur dioxide, sulfur and sodium sulfate;
    (B) boiling gently said reaction medium so as to expel sulfur dioxide;
    (C) filtering the reaction medium residue sequentially of boiling and removing sulfur; and
    (D) continuing boiling said reaction medium after filtering and distilling with reflux of methyl alcohol and methyl formate.

3. Method of recovering chemical values from a formate-sodium hydrosulfite reaction medium after filtering and removing of the sodium hydrosulfite, as in claim 2, including:
    (E) separating sodium sulfate from water within said reaction medium residue, sequentially of filtering and removing sulfur.

4. Method of recovering chemical values from a formate-sodium hydrosulfite reaction medium after filtering and removing of the sodium hydrosulfite as in claim 1, wherein said sulfuric acid is 50% strength.

5. Method of recovering chemical values from a formate-sodium hydrosulfite reaction medium after filtering and removing of sodium hydrosulfite as in claim 1 wherein said introducing of sulfuric acid is an amount in excess of stoichiometric, based upon the total sodium content of the reaction medium after filtering and removing of sodium hydrosulfite.

6. Method of recovering chemical values from a formate-sodium hydrosulfite reaction medium after filtering and removing of the sodium hydrosulfite as in claim 5, including absorbing said sulfur dioxide in water.

7. Method of recovering chemical values from a formate-sodium hydrosulfite reaction medium after filtering and removing of the sodium hydrosulfite as in claim 5, including absorbing said sulfur dioxide in methyl alcohol.

8. Method of recovering chemical values from a formate-sodium hydrosulfite reaction medium after filtering and removing of the sodium hydrosulfite as in claim 5, including absorbing said sulfur dioxide in cold methyl alcohol.

9. Method of recovering chemical values from a formate-sodium hydrosulfite reaction medium after filtering and recovering of the sodium hydrosulfite as in claim 3, wherein said separating of sodium sulfate from water is by evaporating.

10. Method of recovering chemical values from a formate-sodium hydrosulfite reaction medium after filtering and removing of the sodium hydrosulfite as in claim 3, wherein said separating of sodium sulfate from water is by flash drying.

11. Method of recovering chemical values from a formate-sodium hydrosulfite reaction medium after filtering and removing of the sodium hydrosulfite as in claim 3, wherein said separating of sodium sulfate from water is by spraying drying.

12. Method of recovering chemical values from a formate-sodium hydrosulfite reaction medium containing methyl alcohol and methyl formate of approximately 6260 parts, as well as, sodium sulfite, sodium bisulfite and sodium thiosulfate after filtering and removing of the sodium hydrosulfite comprising:
    (A) introducing 50% sulfuric acid approximately 600 parts so as to obtain $SO_2$, sulfur and sodium sulfate;
    (B) boiling gently approximately 30 minutes and expelling approximately 185 parts of sulfur dioxide;
    (C) absorbing said sulfur dioxide in approximately 700 parts of cold methyl alcohol;
    (D) continuing boiling over an approximate 90 minute period, and distilling approximately 4620 parts of methyl alcohol and 375 parts of methyl formate; and
    (E) filtering the reaction medium consisting of approximately 1678 parts and recovering 13 parts of sulfur.

13. Method of recovering chemical values from a formate-sodium hydrosulfite reaction medium of approximately 6260 parts after filtering and removing of the sodium hydrosulfite as in claim 12, including:

(F) separating 430 parts of sodium sulfate from 1235 parts of water sequentially of filtering and removing said sulfur.

14. Method of recovering chemical values from a formate-sodium hydrosulfite reaction medium of approximately 6260 parts after filtering and removing of the sodium hydrosulfite as in claim 13, wherein said reaction medium included:

(A) methyl alcohol 4696 parts;
(B) water 840 parts;
(C) methyl formate 231 parts;
(D) sodium formate 163 parts;
(E) sodium bisulfite 222 parts;
(F) sodium sulfite 45 parts; and
(G) sodium thiosulfate 63 parts.

References Cited

UNITED STATES PATENTS

| | | | |
|---|---|---|---|
| 3,578,703 | 5/1971 | Schoenblum et al. | 260—488 F |
| 1,771,293 | 7/1930 | Gluud et al. | 23—224 R |
| 3,556,722 | 1/1971 | Owaki | 23—178 R |
| 3,576,598 | 4/1971 | Plentovich et al. | 23—116 |

EARL C. THOMAS, Primary Examiner

U.S. Cl. X.R.

423—515, 539, 551; 426—567; 260—488 F